July 10, 1928.
S. N. TIDEMAN
1,676,584
MEANS FOR STRINGING CONDUCTORS
Filed Feb. 18, 1926   2 Sheets-Sheet 1
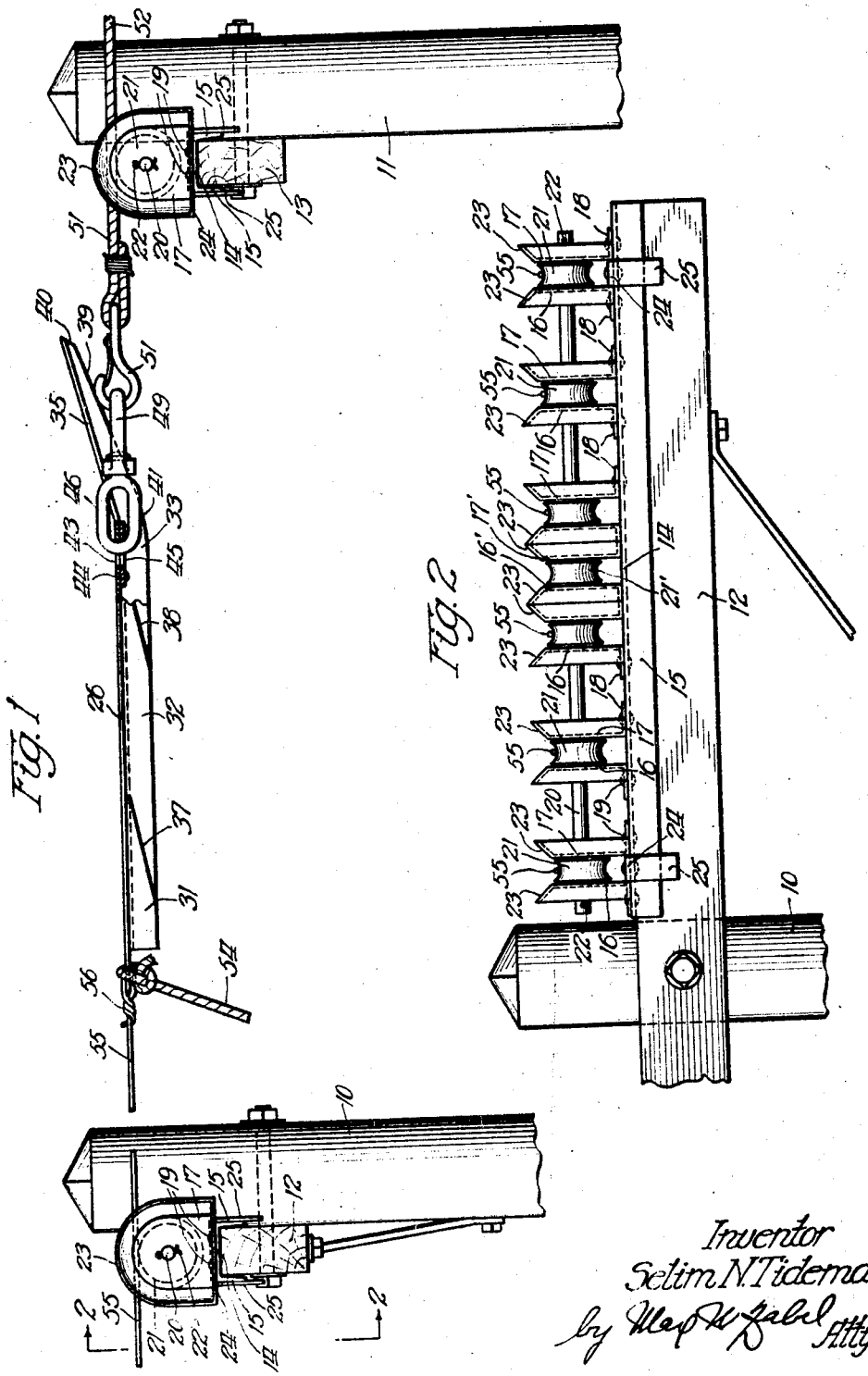
Inventor
Selim N. Tideman

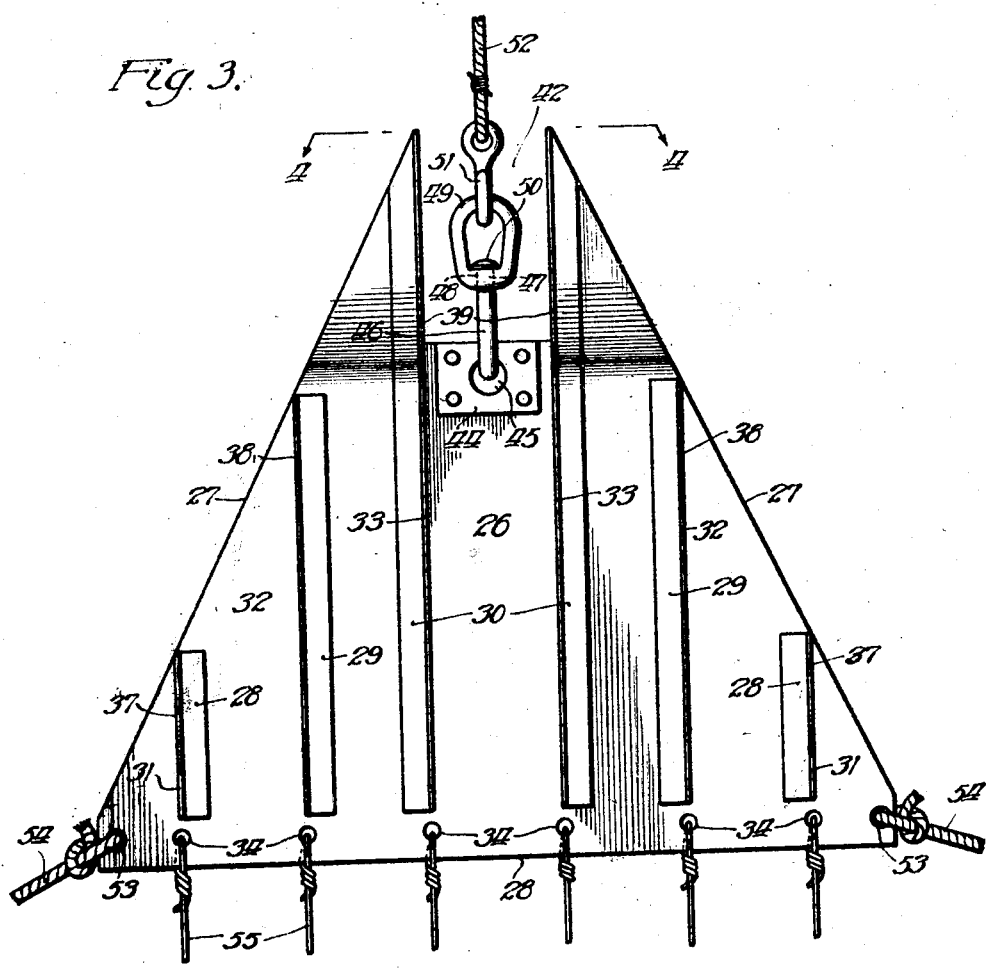
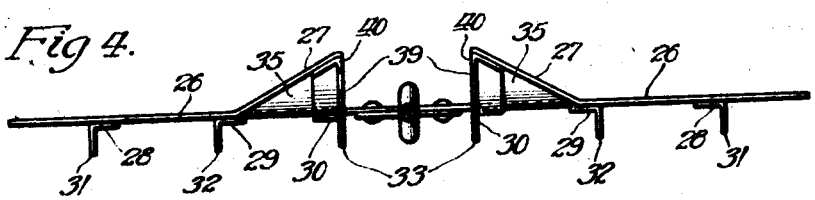

Patented July 10, 1928.

1,676,584

UNITED STATES PATENT OFFICE.

SELIM N. TIDEMAN, OF WILMETTE, ILLINOIS, ASSIGNOR TO PIERCE ELECTRIC COMPANY, A PARTNERSHIP COMPOSED OF J. M. PIERCE, S. N. TIDEMAN, R. A. MORRISON, AND PAUL PIERCE.

MEANS FOR STRINGING CONDUCTORS.

Application filed February 18, 1926. Serial No. 89,249.

My invention relates to means for stringing wires and more particularly to means for stringing a plurality of substantially parallel conductors simultaneously.

It is a purpose of my invention to provide means for stringing wires on overhead supports such as the cross arms of poles by pulling a plurality of said wires across the supporting members at one time and to provide means for holding said wires in substantially parallel relation as the same are being pulled into position to thus prevent the same from becoming entangled in any manner with each other or with an portion of the supporting means.

More particularly it is a purpose of my invention to provide means for stringing wires comprising a member adapted to be mounted on a support such as a cross arm and a member adapted to be drawn over said first mentioned member, said members having cooperating guiding means so that the movable member will be drawn over the other member in a predetermined manner, said guiding means on the stationary member operating moreover to guide the wires that are being strung as the same are pulled over the same to maintain the same substantially in parallelism.

It is a further purpose of the invention to provide a member adapted to be mounted on a support such as a cross arm with antifriction means such as grooved rollers that are adapted to receive the conductors or other wires that are to be strung and that have guiding means adjoining the rollers cooperating with guiding means on the movable member to which the wires that are being strung are attached whereby the wires are guided into position on the rollers to maintain the same in proper relationship to each other. In order to do this, means for securing the conductors or other wires that are to be strung are provided substantially in alignment with the guiding means on the movable member, the securing means being preferably eyes or openings in the rear edge of the movable member aligning with depending guide ribs or runners on the movable member.

It is another purpose of the invention to so construct the movable member that the same may be readily drawn over the member having the rollers thereon so that the same is guided into proper position relative to the member having the rollers thereon whereby the conductors are guided into position between the guide means and into engagement with the rollers. Said means preferably comprises a central roller that is adapted to receive the pulling member mounted on the movable member at the forward end thereof, said movable member being deflected upwardly at its forward end so as to ride over the members having the rollers thereon, said movable member being further provided with guide members in the form of ribs on the under side thereof that are bevelled at their forward ends so as to more readily ride over said stationary members.

It is a further purpose of the invention to provide apparatus for stringing conductors comprising a tapered member having means for attaching a pulling member to the small end thereof, said small end being deflected upwardly and having means for attaching the wires to be strung to the other end thereof. Preferably, said member is further provided with means at the opposite sides of the rear end thereof for guiding the same manually when this is necessary, said means comprising flexible members that extend to the ground that may be maniuplated by an operator from the ground for straightening out the tapering member when this is found to be necessary. The means for attaching the pulling member is preferably so constructed that the pulling member may be swivelly secured to the body portion of the tapered member.

It is another purpose of the invention to provide a member having a base portion that is adapted to be mounted on a support such as a cross arm with a plurality of rollers on the upper side thereof and with guiding means adjacent said rollers, said rollers being arranged in a predetermined spaced relation and extending substantially in parallelism to each other. A central roller for receiving the pulling member is also preferably provided on said base member and is also provided with guiding means and the guiding means are preferably in the form of bevelled flanged-like members on opposite sides of the rollers.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 1 is a view in side elevation, partly broken away, of my improved wire stringing apparatus;

Fig. 2 is a section taken on the line 2—2 of Fig. 1 partly broken away;

Fig. 3 is a plan view of the movable member of the wire straightening apparatus; and Fig. 4 is a section taken on the line 4—4 of Fig. 3.

Referring in detail to the drawings, in Fig. 1 is shown a pair of poles indicated by numerals 10 and 11 and having the cross arms 12 and 13 secured thereto in any suitable manner. Mounted on each of the cross arms is a member having a base portion 14 provided with the depending flanges 15 embracing the cross arms 12 or 13 or any other suitable supporting members. Mounted on the top side of the member 14 are the upstanding bracket members 16 and 17, these being arranged in pairs as will be clear from Fig. 2 and having the base flanges 18 by means of which the same are secured to the member 14 by any suitable securing means such as the rivets 19. The shaft or rod member 20 extends through suitable openings in the members 16 and 17, said openings being in alignment and the grooved rollers or pulleys 21 are mounted on said shaft 20 between each pair of brackets 16 and 17. The pairs of brackets are arranged in substantially equidistantly spaced relation on the member 14 and the rollers 21 are thus spaced substantially equal distances apart along the member 14. Any suitable means, such as cotter pins 22, may be provided for holding the shaft or rod 20 in position. In addition to the equidistantly spaced pairs of brackets 16 and 17, a pair of brackets 16′ and 17′ is provided between two pairs of the first mentioned brackets at substantially the center of the member 14, the grooved roller 21′ being mounted on the shaft 20 between the brackets 16′ and 17′. The brackets 16, 16′, 17, and 17′ are provided with curved inclined flanges 23 extending outwardly in opposite directions from the rollers 21 and 21′ to thus provide bevelled substantially conical guiding members at opposite sides of said rollers. A pair of brackets 24 are further provided at opposite ends of the members 23 having the depending fingers 25 lying on opposite sides of the supporting member 12 or 13 to aid in more readily holding the member 14 in position on the supporting member upon which the same is mounted.

Cooperating with the members 14 mounted on the poles 10 and 11 is a wire pulling device comprising a movable member 26 which is substantially triangular in form, being provided with the inclined or tapering sides 27 and having a straight transverse rear edge 28. The member 26 is provided with a plurality of runners or ribs on the under side thereof arranged in substantially equidistantly spaced relationship to each other, the same being formed by the angles 28, 29 and 30, the angles 28 being the shortest and the angles 30 the longest and having the depending flanges 31, 32, and 33 respectively forming said ribs or runners, the other flanges thereof being secured to the body portion of the member 26 in any desired or well known manner. A plurality of openings 34 arranged substantially in alignment with the flanges or ribs 31, 32, and 33 are provided along the rear end of the member 26, the same lying in a row transversely of the member 26 substantially parallel to the rear edge 28 thereof. The forward end portion of the member 26 is deflected upwardly as indicated at 35 so that when the member 26 is drawn over the members mounted on the poles 10 and 11 or over any projecting parts of the poles or other supporting means, the member 26 will readily pass over any such obstacles and will not become caught thereon. The forward ends of the depending ribs or flanges 31, 32, and 33 are bevelled off as indicated at 37, 38, and 39 respectively so as to also aid the member 26 in passing over any objects that may lie in its path. The bevel 39 is extremely long and the extreme end thereof is further bevelled off as indicated at 40 and the bevelled portion 39 merges with the main flange 33 in a gradual curve 41. The forward or small end of the member 26 is cut away at the center thereof to provide a recess or opening 42, and an opening or eye 43 is provided substantially centrally of the member 26 rearwardly of the recess 42 and a reinforcing plate 44 having a similar opening 45, aligning with the opening 43, is secured to the under side of the member 26.

A swivel member having the loop portion 46 engaging through the eyes or openings 43 and 45 is provided, said member 46 having a forwardly extending shank portion 47 extending through an opening 48 in the loop or link member 49 and being headed at 50 to thus swivelly connect the members 46 and 49 together. The loop or link 49 is adapted to receive a snap hook or other detachable securing means 51 that is secured to the end of the flexible pulling member 52 which can be in the form of a cable or other stranded member. The member 26 is further provided at the rear end thereof, near the opposite sides thereof, with openings 53 for attaching the flexible members 54 thereto, the members 54 extending downwardly to the ground as indicated in Fig. 1. Any suitable wires or other flexible members such as the conductors 55 may be secured in any suitable manner to the member 26 by passing the same through the eyes 34, the same being shown as being twisted in a well known manner at 56 to hold the same in position.

In operation a plurality of the members 14 carrying the rollers 21 and 21' are assembled on the supporting members upon which the conductors are eventually to be secured, such as cross arms 12 and 13. The pulling member 52 is then placed along the pulley or grooved roller 20 or 21' on the first of said members 14 between the guide members 23 at opposite sides thereof and the same is pulled in such a direction that the member 26 is pulled toward the member 14. As the member 26 approaches the member 14 and comes into engagement therewith, the forward upwardly turned end 35 thereof will ride over the flanges 23 and the guide flanges 33, 32, and 31 will successively engage between the guide members 23 in alignment therewith, the bevelled ends, 39, 38, and 37 thereof riding along on said members 23 in case they should engage therewith. As the wires or other flexible members 55 are aligned with the guide members 31, 32, and 33, said members 55 will be guided between the guide flanges 23 and will thus be directed into the grooves of the rollers 21. The member 26 is then drawn inwardly over the next member 14 in the same manner and this is continued until a desired length of said conductors or other flexible members 55 has been placed in position on the poles or other supporting members after which the members 14 are removed and the insulators are put in position in the usual manner and the conductors secured thereto.

In case the member 26 should get so far out of alignment as it is drawn along that the guide members thereon will not properly engage with the guide members on the members 14, the guide ropes 54 can be manipulated to straighten out the member 26 although this would ordinarily not be necessary. The conductors will thus be mounted in proper parallel arrangement and will be prevented from tangling as the same are being strung. Moreover, the large number of conductors can thus be strung on poles or other supports very quickly and efficiently.

Having thus described my invention what I desire to claim and secure by United States Letters Patent is:

1. In a device of the character described, the combination with a member adapted to be mounted on a cross arm and having spaced guiding means thereon, of a member adapted to be drawn over said first mentioned member and having substantially parallel guiding means thereon cooperating with said first mentioned guiding means, and means for securing wires to said last mentioned member substantially in alignment with the guiding means thereon.

2. In a device of the character described, a pair of members having co-operating guiding means thereon, one of said members having spaced rollers thereon and the other of said members having means for securing wires thereto in spaced relation with said wires passing each over one of said rollers and a pulling member secured to said last mentioned member.

3. In a device of the character described, a member having a plurality of ribs on the under side thereof and provided with openings along one edge thereof, said openings aligning substantially with said ribs.

4. In a device of the character described, the combination with a stationary member having spaced guiding means mounted thereon, of a member adapted to be drawn over said stationary member, having guiding means co-operating therewith, and means for securing wires on said last mentioned member substantially in alignment with said guiding means.

In witness whereof, I hereunto subscribe my name this 11th day of February, A. D. 1926.

SELIM N. TIDEMAN.